(12) United States Patent
Xia et al.

(10) Patent No.: US 9,823,458 B2
(45) Date of Patent: Nov. 21, 2017

(54) IMAGING SYSTEM AND METHOD FOR MULTI-SCALE THREE-DIMENSIONAL DEFORMATION OR PROFILE OUTPUT

(71) Applicant: Georgia Tech Research Corporation, Atlanta, GA (US)

(72) Inventors: Shuman Xia, Alphretta, GA (US); Jingwen Zhang, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 638 days.

(21) Appl. No.: 13/955,792

(22) Filed: Jul. 31, 2013

(65) Prior Publication Data

US 2014/0036042 A1 Feb. 6, 2014

Related U.S. Application Data

(60) Provisional application No. 61/677,535, filed on Jul. 31, 2012.

(51) Int. Cl.
| | |
|---|---|
| H04N 13/02 | (2006.01) |
| G02B 21/36 | (2006.01) |
| G01B 9/04 | (2006.01) |
| G01B 11/16 | (2006.01) |
| G01B 11/24 | (2006.01) |
| G02B 21/00 | (2006.01) |
| G02B 27/10 | (2006.01) |
| G02B 27/48 | (2006.01) |

(52) U.S. Cl.
CPC .............. *G02B 21/361* (2013.01); *G01B 9/04* (2013.01); *G01B 11/16* (2013.01); *G01B 11/24* (2013.01); *G02B 21/0016* (2013.01); *G02B 27/1093* (2013.01); *G02B 27/48* (2013.01); *H04N 13/0207* (2013.01)

(58) Field of Classification Search
CPC .. G02B 21/361; G02B 21/0016; G02B 27/48; G02B 27/1093; G01B 11/16; G01B 9/04; G01B 11/24; H04N 13/0207
See application file for complete search history.

(56) References Cited

U.S. PATENT DOCUMENTS

| | | | | |
|---|---|---|---|---|
| 5,796,487 | A * | 8/1998 | Guerra ................. | G01B 11/303 356/613 |
| 2001/0045529 | A1* | 11/2001 | Iketaki ................. | G01J 3/4406 250/493.1 |
| 2008/0315093 | A1* | 12/2008 | Hasegawa ............ | G01N 23/225 250/310 |

OTHER PUBLICATIONS

Marcelo Trivi and Hector J. Rabal, "Stereoscopic uses of diffraction gratings", Mar. 15, 1988, Applied Optics, vol. 27, No. 6.*

* cited by examiner

*Primary Examiner* — Sath V Perungavoor
*Assistant Examiner* — Xiaolan Xu
(74) *Attorney, Agent, or Firm* — Troutman Sanders LLP; Ryan A. Schneider; Brennan M. Carmody (57) ABSTRACT

An optical microscope system for 3D surface deformation and morphology measurement that can serve as a powerful tool in quality engineering and control, as well as in biological and materials research is described. The system was developed in part by combining the DAIC technique with optical microscopy. Decoding algorithms were derived for calculating the 3D displacement or profile of a micro-sized test sample from the in-plane displacement components of it first-order diffracted views.

20 Claims, 7 Drawing Sheets

-1st order view     +1st order view

IMAGING SYSTEM AND METHOD FOR MULTI-SCALE THREE-DIMENSIONAL DEFORMATION OR PROFILE OUTPUT

CROSS-REFERENCE TO RELATED APPLICATIONS

This application claims the benefit of US Provisional Application No. 61/677,535 filed 31 Jul. 2012, the entire contents and substance of which are hereby incorporated by reference.

STATEMENT REGARDING FEDERALLY SPONSORED RESEARCH OR DEVELOPMENT

N/A

BACKGROUND OF THE INVENTION

1. Field of Invention

The present invention generally relates to the art of microscopy, and more particularly to a three-dimensional optical microscope for multi-scale deformation and shape measurement.

2. Background and Related Art

Three-dimensional (3D) full-field deformation and morphology analyses are widely used in many industrial and research applications. Driven by advances in biology and nanotechnology, there is a growing need for performing such analyses at the micro-scale. A good example in point is the study of deformation and failure mechanisms of complex material systems. Detailed experimental full-field characteristics, in combination with theoretical and/or computational modeling, can provide crucial information in helping establish their microstructure-property relationships.

There are a range of optical techniques for measuring height profiles and displacements in 3D. Existing optical surface-profiling techniques can be divided into two categories: spatial-scanning methods and full-field methods.

The first category includes scanning-laser confocal microscopy, chromatic depth scanning method, and laser spot scanning or line scanning approaches. All of these methods are intrinsically point-wise or line-wise scanning methods, but can achieve full-field measurement by means of spatial scanning.

In the second category of inherent full-field methods, topographic reconstruction is done by processing two-dimensional (2D) optical images. Some of the commonly used full-field methods include white light and laser interferometry, projection Moire interferometry, depth from focus/defocus (DFF/DFD), as well as 3D digital image correlation (DIC). In general, the full-field methods allow much faster 3D topographic imaging than the spatial-scanning methods.

A small number of approaches are available for 3D full-field surface displacement measurement. Among them, electronic speckle pattern interferometry (ESPI) offers the highest sensitivity, but suffers from very limited measurement range due to speckle decorrelation. In recent years, 3D-DIC is being increasingly used for 3D deformation characterization for its ease of operation.

Despite the advent of the above measurement techniques, high-accuracy 3D surface deformation and profile characterizations at the micro-scale, however, remain a great challenge. Traditional optical microscopes can achieve sub-micron spatial resolution, but they are only capable of 2D imaging. In a recent study, a freeform prism array was developed that could be attached to the objective of a microscope to enable 3D stereo imaging. It demonstrated the viability of the method through quantitative 3D imaging tests, but did not provide an imaging processing algorithm for quantitative 3D shape reconstruction.

An image correlation-based technique, named diffraction assisted image correlation (DAIC), for 3D full-field deformation and profile measurement, is also known. The DAIC method utilizes a transmission grating and a single camera to achieve 3D perception, making it particularly suitable for both macroscopic and microscopic measurements.

Driven by a growing need in the fields of biomechanics and micro- and nano-mechanics research, non-contact full-field deformation characterization at micro-scale is gaining prominent significance, but has yet been satisfactorily achieved. While the traditional 3D-DIC combined with a stereo microscope has shown the capability to measure 3D deformation with micro-scale spatial resolution, the application of this technique to smaller length scales is hindered by the low-magnification power of stereo microscopy.

Therefore, there is a need for a 3D deformation measurement method with sub-micron spatial resolution. It is to the provision of such a system and method that the present invention is primarily directed.

BRIEF SUMMARY OF THE INVENTION

Briefly described, in a preferred form, the present invention is a 3D deformation and profile measurement method with sub-micron spatial resolution. More particularly, it is a 3D microscope system.

In an exemplary embodiment, the present invention comprises a microscope objective to form an intermediate real image of a micro-sized sample. A diffraction grating, located behind the real image, creates two first-order virtual images of the intermediate real image. A pair of relay lenses is used to project the real and virtual images onto a senor plane of a digital camera. The object surface to be measured is patterned with fluorescent powder and illuminated by an ultraviolet light-emitting diode (LED) light source. An iris diaphragm is positioned in the illumination path so that the size and location of the illuminated area can be controlled. A bandpass filter is located in the imaging path, to filter out the background light as well as to suppress chromatic dispersion of the transmission grating. The entire setup can be placed on a vibration isolation table to reduce external vibrations.

The present optical microscope system can be used to measure 3D surface deformation and morphology across multiple length scales. The system provides beneficial features that are not offered by conventional measurement techniques, including:

providing full-field, non-contact measurement of 3D displacement components and shapes of complex objects;

providing a wide range of fields-of-view suitable for multi-scale characterizations (from 5×5 mm down to 25×25 µm); and providing high measurement accuracy (sub-pixel accuracy of ~10 nm at the smallest field-of-view).

In an exemplary embodiment, the present invention comprises a 3D microscope system comprising an add-on module attached to a photoport of a microscope to enable 3D full-field measurement. The add-on module comprises a high numerical aperture tube lens, a transmission grating, a pair of relay lenses, and a high-sensitivity digital camera. The grating is placed in the imaging path to create two first-order diffraction images that encode the information of 3D deformation and morphology.

Decoding of the 3D information is straightforward and involves only 2D digital image correlation (2D-DIC) calculations or other types of 2D displacement analysis. A set of infinity-corrected microscope objectives (0.5×, ×, 4×, 10×, 40×, and 100×) are used to achieve different spatial resolutions for multi-scale characterizations. The object surface to be measured is patterned with fluorescent powder and illuminated by an ultraviolet LED light source. A bandpass filter is used to filter out background light as well as suppress chromatic dispersion of the transmission grating.

Optical design software was used to simulate and optimize the performance of the system. The design variables included the characteristic parameters of the optical elements, the dimensions of the mechanical housings, and the precise layout of the key components. A novel microscope stand that offers a flexible sample space was also designed.

The overall geometrical distortion of the imaging lenses were calibrated using a precision flat surface. The measurement accuracy of the system was quantitatively assessed through profile measurements of surface steps as well as displacement characterizations of 3D rigid-body translations and rotations.

The present 3D microscope system serves as a powerful tool to study multi-scale experimental mechanics of various complex material systems, such as heterogeneous materials, multifunctional wrinkled surfaces, and nano-structured metals. Such examination was heretofore not available.

In another exemplary embodiment, the present invention is a 3D imaging system providing sub-micron spatial resolution of a surface of a sample comprising an illumination path used to illuminate at least a surface of a sample, an imaging path used to image at least a surface of the sample, an imaging system located in the imaging path, an objective located in the illumination and imaging paths, and positioned between the imaging system and the sample to provide an intermediate real image of at least a surface of the sample, a diffraction grating located in the imaging path, and positioned between the imaging system and the objective to provide a plurality of virtual images of the intermediate real image, relay lenses located in the imaging path, and projecting a real image of at least a surface of the sample to the imaging system, and a computer processor in communication with the imaging system for processing data related to the plurality of virtual images of the intermediate real image and the real image, and for producing sub-micron spatial resolution 3D data of at least a surface of the sample.

The system can further comprise an ultraviolet light source for the illumination path and an iris diaphragm in the illumination path to control the one or both of the size and location of the area of the surface illuminated.

In another exemplary embodiment, the present invention is a 3D imaging system for a sample comprising an imaging system, a first optical element positioned between the imaging system and the sample to provide an intermediate real image of at least a surface of the sample, a second optical element positioned between the imaging system and the first optical element to provide a plurality of virtual images of the intermediate real image, and a computer processor in communication with the imaging system for processing data related to the plurality of virtual images of the intermediate real image and for producing 3D data of at least a surface of the sample.

The system can provide sub-micron spatial resolution of a surface of the sample.

The first optical element can comprise an objective. The second optical element can comprise a dispersive element. The dispersive element can comprise a diffraction grating.

The system can further comprise a third optical element to project a real image of at least a surface of the sample to the imaging system, wherein the computer processor processes data related to the real image and the plurality of virtual images of the intermediate real image to produce 3D data of at least a surface of the sample.

The third optical element can comprise one or more relay lenses.

The system can further comprise an energy source to energize at least a surface of the sample. The energy source can comprise an ultraviolet light source.

The system can further comprise an energy source control to control the energization of at least a surface of the sample. The energy source control can comprise a diaphragm to control the one or both of the size and location of the area of the surface energized.

The system can further comprise a filter positioned in the imaging path to filter out background light as well as to suppress chromatic dispersion of the diffraction grating.

The system can further comprise a beamsplitter to couple the illumination path into the imaging path.

The system can further comprise a condenser lens and reflecting mirror in the illumination path.

In another exemplary embodiment, the present invention is a method of three-dimensional imaging comprising directing an imaging system at a first optical element positioned between the imaging system and a sample, forming an intermediate real image of at least a surface of the sample, forming a plurality of virtual images of the intermediate real image, and processing data related to the plurality of virtual images of the intermediate real image to produce three-dimensional data of at least a surface of the sample.

The step of forming a plurality of virtual images of the intermediate real image can comprise forming a plurality of virtual images of the intermediate real image via a second optical element positioned between the imaging system and the first optical element.

The method can further comprise projecting a real image of at least a surface of the sample to the imaging system, wherein the step of processing data comprises processing data related to the real image and the plurality of virtual images of the intermediate real image to produce three-dimensional data of at least a surface of the sample.

The present invention can be used to make measurements at smaller length scales than previously known. Such a conventional application is described in detail in "Diffraction Assisted Image Correlation: A Novel Method for Measuring Three-Dimensional Deformation using Two-Dimensional Digital Image Correlation," Experimental Mechanics, DOI 10.1007/s11340-012-9687-0, to the inventors hereof and published online 23 Oct. 2012, which publication is incorporated by reference herein in its entirety for all purposes. The present invention improves upon the DAIC technique disclosed in US Patent Publication 20130147919, which patent application is incorporated by reference herein in its entirety for all purposes.

These and other objects, features and advantages of the present invention will become more apparent upon reading the following specification in conjunction with the accompanying drawing figure.

BRIEF DESCRIPTION OF THE DRAWINGS

FIGS. 7(a) is the negative first- and positive first-order views of a speckle-patterned spherical surface; (b) the contour plot of the measured surface profile; and (c) the height profiles along the two dashed section lines shown in (b).

DETAILED DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" or "nearly free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Moreover, the various illustrative processes described in connection with the embodiments herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, DisplayPort, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein. The camera may be a digital camera of any type including those using CMOS, CCD or other digital image capture technology.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on, transmitted over or resulting analysis/calculation data output as one or more instructions, code or other information on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and BLU-RAY disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

In an exemplary embodiment, the present invention 100 comprises a 3D imaging system for a sample P comprising an imaging system 110, a first optical element 120 positioned between the imaging system 110 and the sample P, a second optical element 130 positioned between the imaging system 110 and the first optical element 120, and a computer processor 140 as part of, or in communication with the imaging system 110, for processing data related to the plurality of virtual images of an intermediate real image and for producing 3D data of at least a surface of the sample P.

Figure 1:
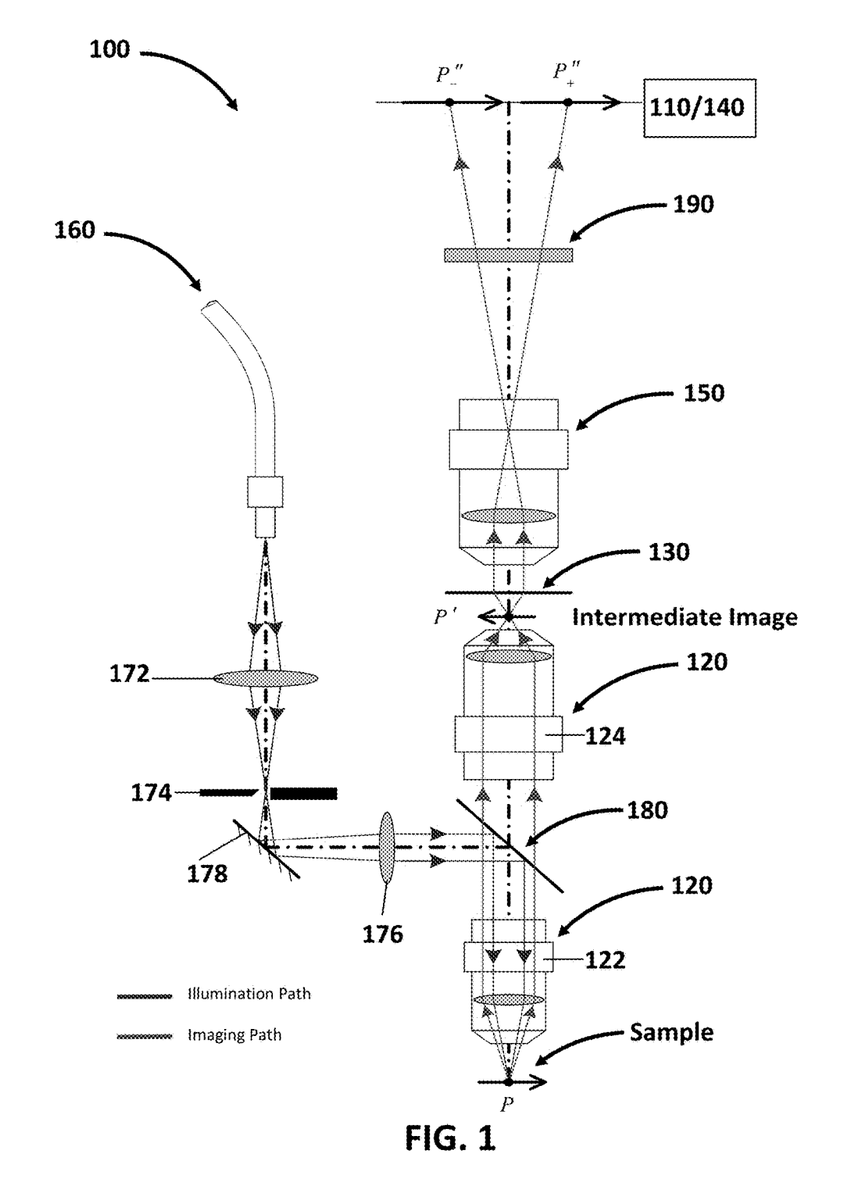
FIG. 1 is a schematic layout of the optical microscope for three-dimensional (3D) surface displacement and profile measurement of the present invention, according to an exemplary embodiment.
Figure 2:
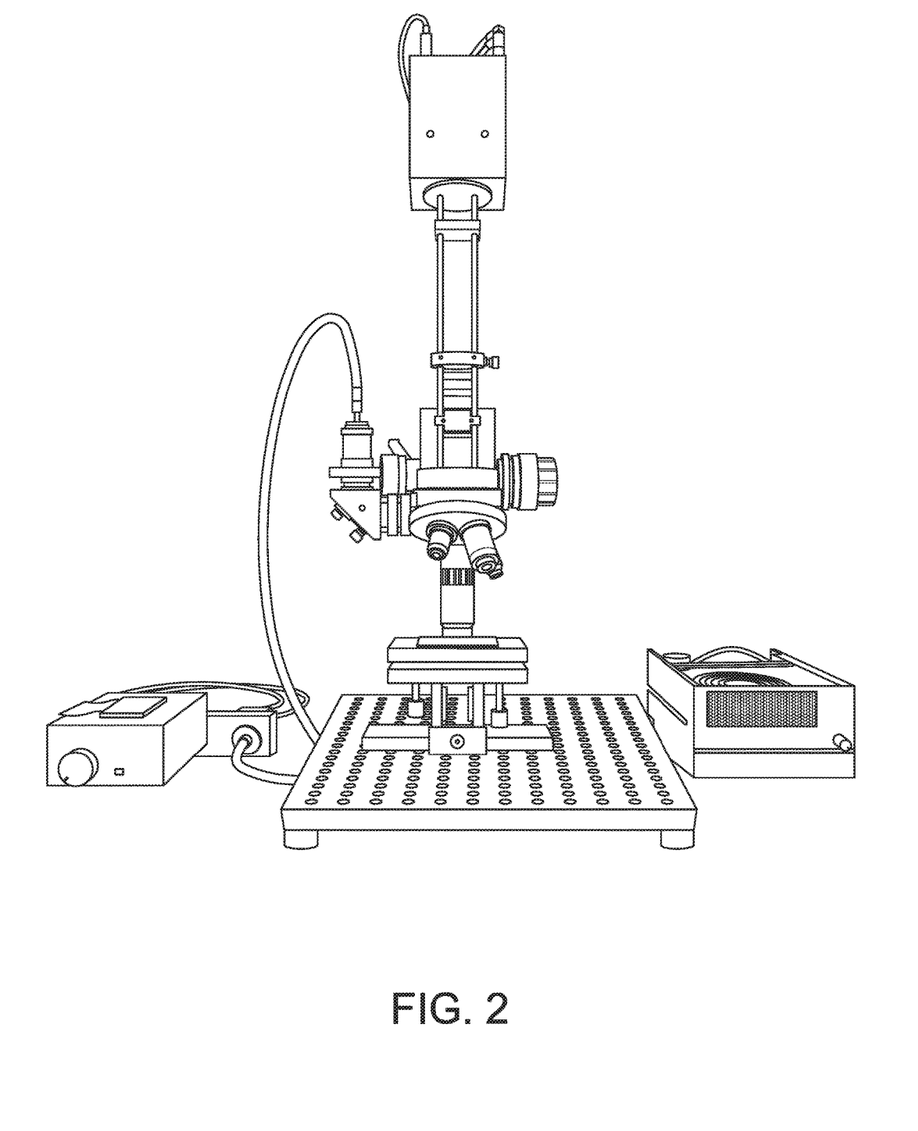
FIG. 2 is a photograph of the system of FIG. 1.

FIGS. 1 and 2 show a schematic and actual experimental setup of present invention 100. A Cartesian coordinate system o(x, y, z) is shown FIG. 1. The layout of the present microscope closely resembles that of an epi-illuminated fluorescence microscope.

The first optical element 120 can comprise an objective formed by two infinity-corrected microscope objectives 122, 124. The objectives 122, 124 are placed back to back and are used to form an intermediate real image P' of a micro-sized sample P.

The second optical element 130 can be a transmission diffraction grating 130 positioned right above the real image. In some embodiments, the grating 130 has a constant line spacing of 2000 nm, and a rectangular profile specially designed to suppress the zeroth-order light diffraction and enhance the intensity of the two first-order diffracted beams. The ruling of the grating 130 is aligned with the y-direction.

Therefore, diffraction by the transmission grating 130 along the x-direction creates two first-order virtual images of the intermediate real image.

The choice of groove density of the grating 130 (at a given wavelength, X) will dictate the diffraction angle and hence the images that may be collected by the camera. While the examples were configured to avoid image overlap, it is not necessary that image overlap be avoided in all embodiments.

Another optical element can comprise a third microscope objective 150 used to project the virtual images onto a senor plane of the imaging system 110.

In an exemplary embodiment, the infinity-corrected microscope objectives 122, 124 are Nikon CFI Plan Apo 20x, N.A. 0.75 and Olympus UPlanFL N 20x, N.A. 0.50 objectives. The transmission diffraction grating 130 can comprise an Ibsen Photonics, Denmark grating. The third microscope objective 150 can comprise a Nikon BD Plan 20x , N.A. 0.4. The imaging system 110 can comprise a high-resolution, Peltier-cooled CCD camera with 16-bit digital digitization, ML8300M, Finger Lakes Instrumentation, Lima, N.Y.

Illumination of the sample P from an energy source 160 to energize at least a surface of the sample P can be provided by an ultraviolet (UV) light-emitting diode (LED) light source 160. An energy source control 170 to control the energization of at least a surface of the sample P can comprise a condenser lens 172, an iris field diaphragm 174, and a relay lens 176 positioned in the illumination path so that the size and location of the illuminated area can be precisely controlled. A reflecting mirror 178 can be used in the illumination path to compact the system. Coupling of the illumination path into the imaging path can be provided by a dichroic beamsplitter 180.

A filter 190 can comprise a narrow-band-pass filter 190 positioned in the imaging path to filter out the background light as well as to suppress chromatic dispersion of the transmission grating 130. The entire setup can be placed on a vibration isolation table to reduce external vibrations.

The 3D surface displacement or profile of the sample is encoded in the projected first-order images ($P_-$" and $P_+$"). Decoding of such 3D data requires 2D full-field displacement analysis of the first-order diffracted images. This analysis can be carried out using a 2D digital image correlation (DIC) method. A random speckle pattern required for the implementation of DIC can be created by coating the sample P surface with a speckle source Sp, for example, fluorescent polymer particles $S_p$.

In the case of displacement measurement, such speckling or another affixed/permanent (e.g., laser or chemical etching) marker/patterning strategy for the sample is required to facilitate correlation. For profile measurement, the same or a projected (e.g., by laser, etc.) marker/patterning may be employed. Per above, speckling is desired for the DIC examples, otherwise a regular marker pattern may be employed.

In an exemplary embodiment, the light source 160 can be provided by a GCS-0365-07, Mightex Systems, Toronto, Canada. The filter 190 can comprise a narrow-band-pass filter 190 (450±10 nm bandpass, Thorlabs Inc, Newton, N.J.). The speckle source $S_P$ can comprise fluorescent polymer particles of diameters between 1-5 microns (FMB-1UM-5UM, Cospheric LLC, Santa Barbara, Calif.).

System 100 also optionally also includes the computer processor/system 140 with (optional) display running purpose-appropriate software. A digital sensor (e.g., CMOS or CCD) within imaging system 110 captures image data. The recorded data may be processed by microprocessor within the system 110 and/or by the computer processor/system 140. In the latter case, the data may be transmitted from the system 110 sensor and associated electronics by wired connection (not shown) or wireless communication using any of a variety of protocols.
Theory Decoding of 3D Surface Displacement The 3D displacements of the sample (P) and its intermediate image (P') are assumed to be related according to the following linear relationship:

$$u_{p'} = M_{xy} u_p + \alpha_x (x - x_c) w_p \qquad (1a)$$

$$v_{p'} = M_{xy} v_p + \alpha_y (y - y_c) w_p \qquad (1b)$$

$$w_{p'} = M_z w_p \qquad (1c)$$

in which $M_{xy}$ and $M_z$ are the in-plane and out-of-plane magnification factors, $\alpha_x$ and $\alpha_y$ are the coupling coefficients that account for the non-telecentricity of the imaging system, and $x_c$ and $y_c$ are the coordinates of the center of perspective projection. The 3D displacement of the intermediate image is further related to the in-plane displacements of the two first-order diffracted images (P_" and P_+") through $$u_{p_-}{''} = N_{xy}(u_{p'} + w_{p'} \tan\theta) \qquad (2a)$$

$$u_{p_+}{''} = N_{xy}(u_{p'} - w_{p'} \tan\theta) \qquad (2b)$$

$$v_{p_-}{''} = v_{p_+}{''} = N_{xy} v_{p'} \qquad (2c)$$

where $N_{xy}$ is the magnification factor of objective 150 and $\theta$ is the first-order diffraction angle of the grating 130.

By substituting Eqs. 2(a)-(c) into Eqs. 1(a)-(c) and inverting the resulting equations, the 3D displacement of the sample is obtained as:

$$w_p = \frac{1}{2N_{xy} M_z \tan\theta}(u_{p_-}{''} - u_{p_+}{''}) = \beta_1 \frac{(u_{p_-}{''} - u_{p_+}{''})}{2} \qquad (3a)$$

$$u_p = \frac{1}{2N_{xy} M_z}(u_{p_-}{''} + u_{p_+}{''}) - \frac{\alpha_x (x - x_c)}{M_{xy}} w_p = \qquad (3b)$$

$$\beta_2 \frac{(u_{p_-}{''} + u_{p_+}{''})}{2} - \beta_3 (x - x_c) w_p$$

$$v_p = \frac{1}{2N_{xy} M_z}(v_{p_-}{''} + v_{p_+}{''}) - \frac{\alpha_y (y - y_c)}{M_{xy}} w_p = \qquad (3c)$$

$$\beta_2 \frac{(v_{p_-}{''} + v_{p_+}{''})}{2} - \beta_4 (y - y_c) w_p$$

Once the in-plane displacement fields of the two first-order diffracted views are obtained, the above equation can be used to calculate the 3D full-field displacement of the sample. The free parameters of the optical system, $\beta_i (i=1-5)$, can be calibrated against a known 3D displacement field.

Decoding of 3D Surface Profile 3D profile measurement of a curved surface involves determining the surface height, h, as a function of in-plane coordinates, $x_p$ and $y_p$. To derive a governing equation for profile measurement, we consider a virtual process in which the surface is initially flat and is deformed into the final curved shape with an out-of-plane displacement of w=h. Let $X_{p_-}{''}$ and $X_{p_+}{''}$ denote the initial x-coordinates of the first-order diffracted images and $x_{p_-}{''}$ and $x_{p_+}{''}$ denote the corresponding x-coordinates in the final configuration. According to Eq. (3a), we have $$w(x_{p''}, y_{p''}) = \qquad (4)$$
$$\frac{\beta_1}{2}(u_{p_-}{''} - u_{p_+}{''}) = \frac{\beta_1}{2}[(x_{p_-}{''} - X_{p_-}{''}) - (x_{p_+}{''} - X_{p_+}{''})] = -\frac{\beta_1}{2} u_{p''} + C$$

in which $u_{p''} = x_{p_+}{''} - x_{p_-}{''}$ is the relative displacement between the two first-order diffracted views in the final configuration, and $$C = \frac{\beta_1}{2}(X_{p_+}{''} - X_{p_-}{''})$$

is the relative displacement in the initial configuration. Here C is a constant, since the surface is made to be flat in the initial configuration.

Then we map w from the coordinate space of the diffracted views to that of the sample to obtain:

$$h(x_p, y_p) = w\left(\frac{x_p}{\beta_2}, \frac{y_p}{\beta_2}\right) = -\beta_1 u_{p''} \qquad (5)$$

In writing the above equation, we have dropped the constant term, C. This causes a shift in the measured profile but does not affect the actual shape of the sample. The full-field distribution of $u_{p''}$ can be measured by correlating the two first-order diffracted images with the DIC method, and Eq. (5) can then be used to obtain the surface profile of the sample.

Results

3D Surface Displacement Measurement

Figure 3:
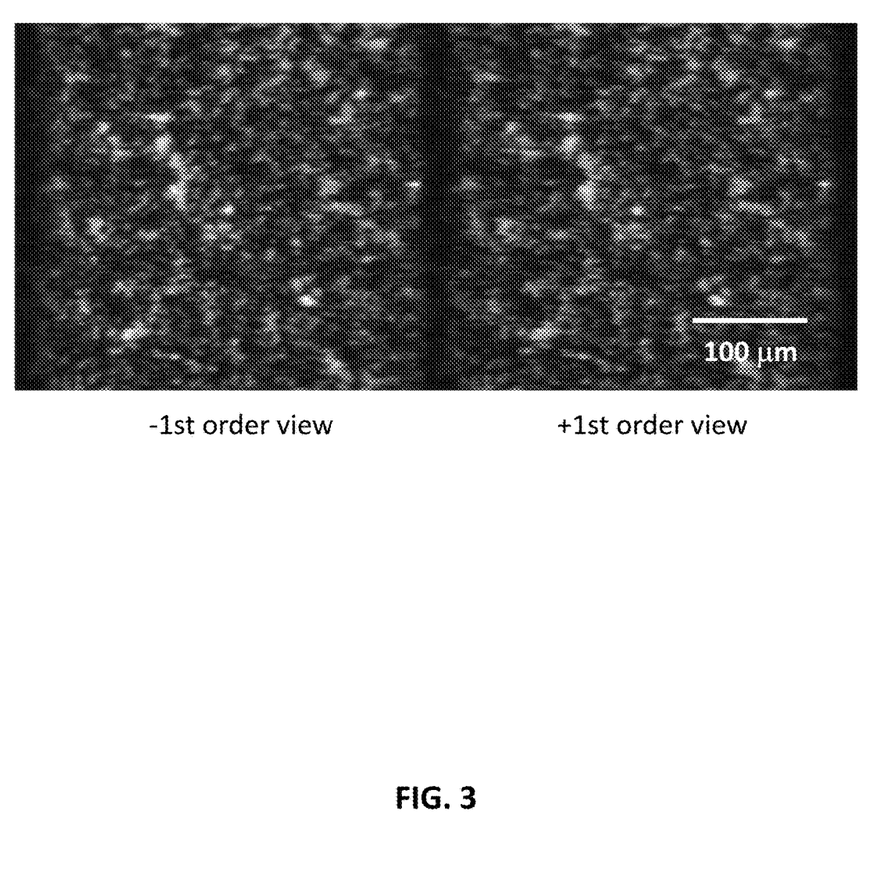
FIG. 3 is the negative first- and positive first-order views of a speckle-patterned region on a flat glass slide.

Rigid-body translation and rotation experiments were conducted to assess the validity of the 3D microscope system for displacement measurement. A flat glass slide speckled with fluorescent particles was used as a test sample in the both experiment. FIG. 3 shows the negative first (−1) and positive first (+1) diffraction order views of a selected region on the glass slide, each of which has a field of view of 320 μm×340 μm and a pixel resolution of 0.53 μm/pixel. Note that the zeroth-order view, which corresponds to direct light transmission through the grating, does not show up due to strong intensity suppression of the zeroth-order diffraction.

In the rigid-body translation experiment, the glass slide was translated along the vertical (z) axis for 10.0 μm using a differential micrometer driven translation stage (PT1A, Thorlabs Inc, Newton, N.J.). Four speckle images, including two negative first-order (−1st) images and two positive first-order (+1st) images were captured before and after the rigid-body translation.

Figure 4:
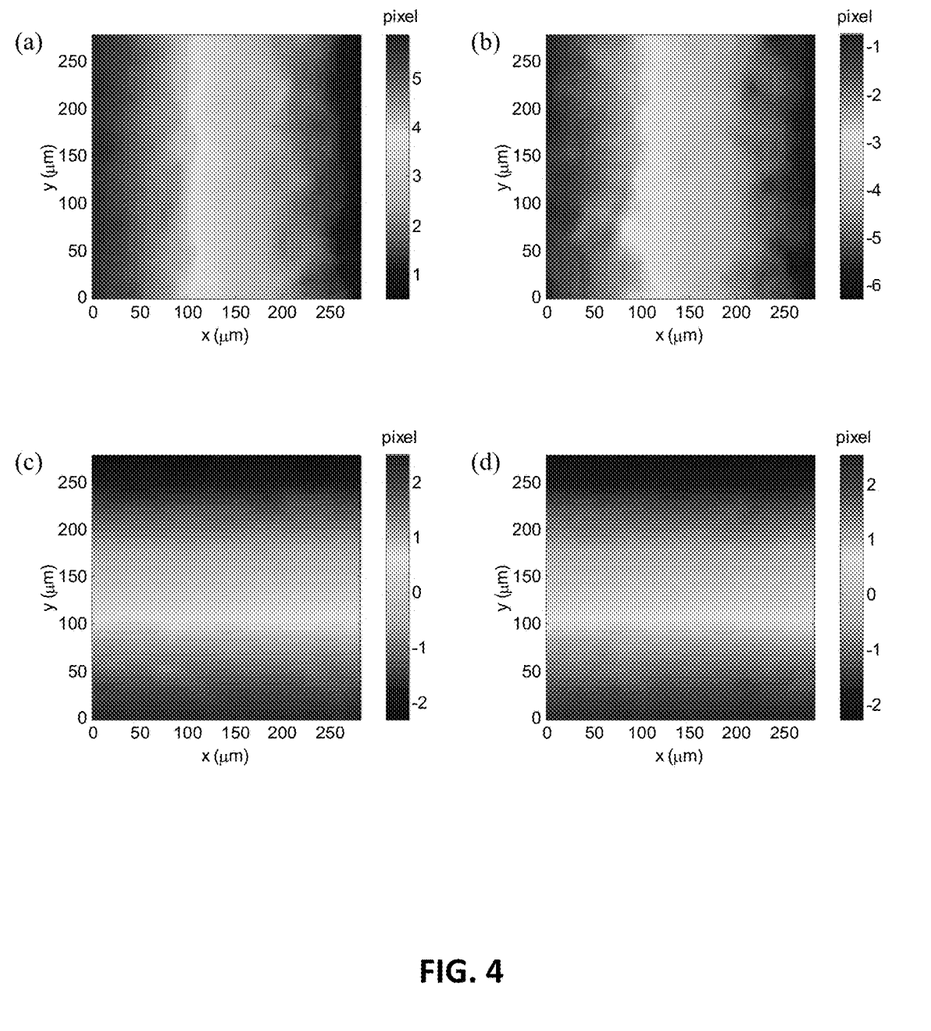
FIGS. 4(a)-(d) are in-plane displacement maps of the two first-order diffracted views due to an out-of-plane rigid-body translation of 10.0 μm: (a) negative first order ($u_{p_-}$); (b) positive first order ($u_{p_+}$); (c) negative first order ($v_{p_-}$); (d) positive first order ($v_{p_+}$).

2D-DIC analysis was carried out between the −1st order images and between the +1st order images, yielding two sets of in-plane displacements ($u_{p_-}{''}$, $v_{p_-}{''}$) and ($u_{p_+}{''}$, $v_{p_+}{''}$) as shown in FIG. 4. Because light diffraction only acts in the x direction, the two y-displacement maps are nearly identical. In contrast, the two x-displacement maps encode the out-of-plane displacement of the sample in different ways, and therefore exhibit a large difference (note the difference in the displacement ranges). The sample does not have any in-plane motion. However, all of the four displacement fields are linearly varying with similar gradient magnitudes, indicating that the non-telecentricity of the microscope is significant.

Figure 5:
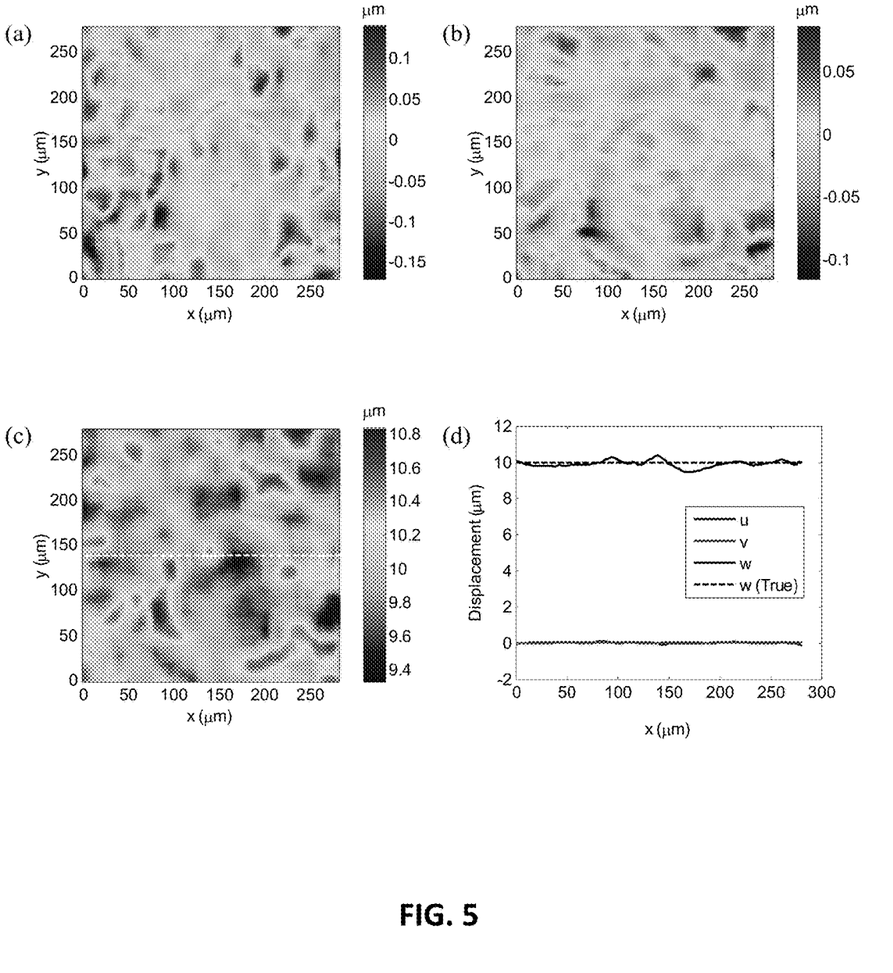
FIGS. 5(a)-(d) are the measured 3D displacement fields due to an out-of-plane translation of 10.0 μm: (a) $u_p$; (b) $v_p$; (c) $w_p$; (d) displacement profiles along the dashed section line shown in (c).

The four displacement maps shown in FIG. 4 were used in Eq. 3(a)-(c) to calculate the in-plane displacements ($u_p$, $v_p$) and out-of-plane displacement ($w_p$) of the sample. The optical parameters in these equations were obtained by least-squares fitting the calculated displacements to the actual imposed displacements. FIGS. 5(a)-(c) show the contour plots of the calculated in-plane and out-of-plane displacement components. The displacement profiles along the central horizontal line are plotted in FIG. 5(d).

To further demonstrate the measurement capability of the microscope, a second experiment was carried out in which the glass side was tilted about an axis along the y-direction for 6.0 degrees using a tilt stage. The tilt produced constant in-plane displacement components and a linearly varying out-of-plane displacement field.

Figure 6:
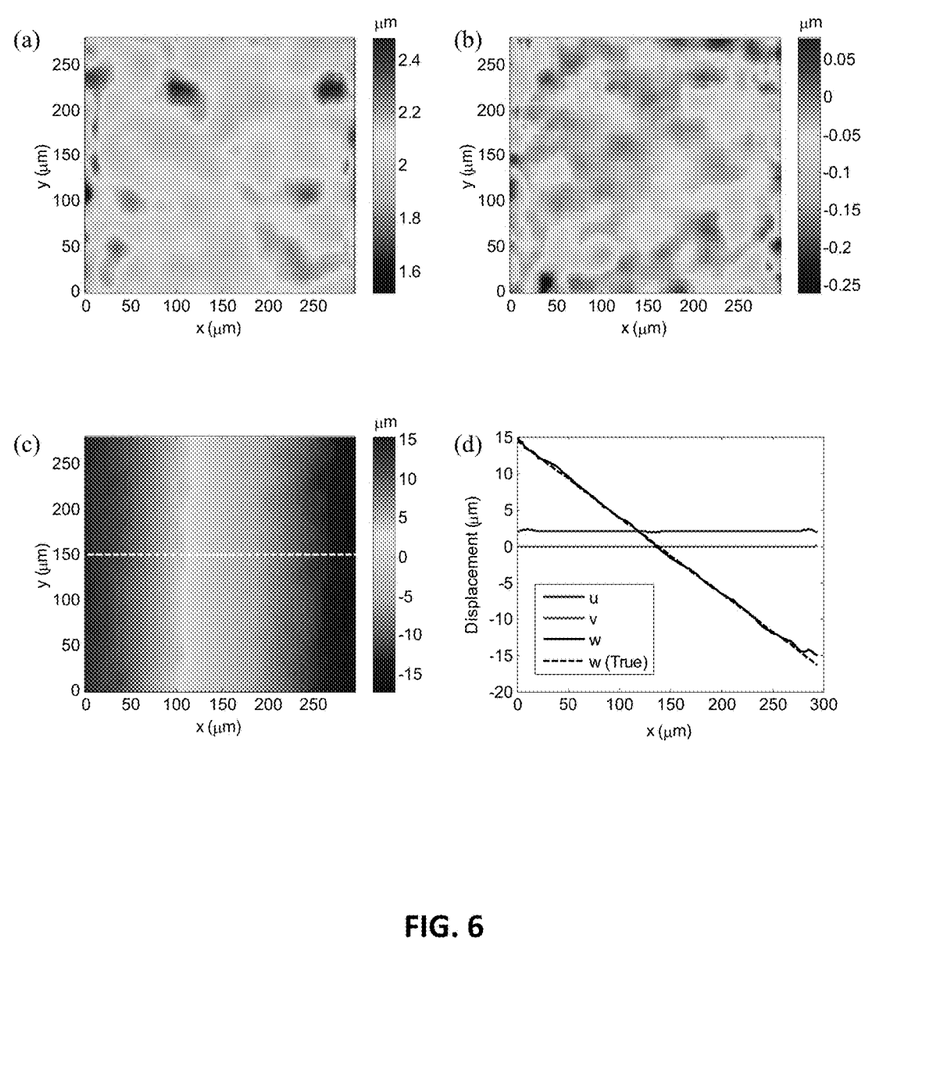
FIGS. 6(a)-(d) are the measured 3D displacement fields due to an out-of-plane tilt of 6.0 degrees: (a) $u_p$; (b) $v_p$; (c) $w_p$; (d) displacement profiles along the dashed section line shown in (c).

Similar to the first experiment, four in-plane displacement components of the first-order diffracted views were measured. The previously calibrated optical parameters were used to calculate the 3D displacements from these in-plane displacement maps. The obtained 3D displacement fields are presented in FIGS. 6(a)-(c). FIG. 6(d) shows the measured 3D displacement profiles along the dashed section line in FIG. 6(c), together with the true out-of-plane displacement profile. The measured and true out-of-plane displacements compare favorably with each other.

3D Surface Profile Measurement

Figure 7:
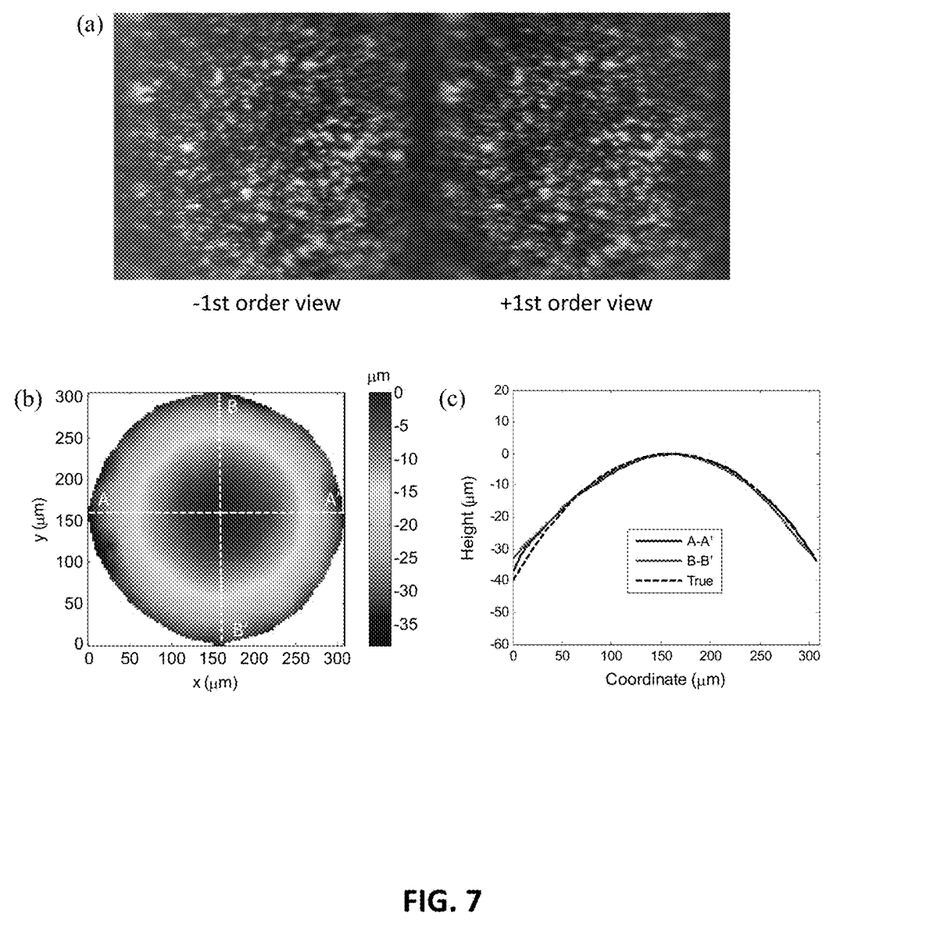

The surface profiling capability of the microscope was tested by profiling the top surface of a steel ball (0.68 mm in diameter). The two first-order diffracted views of the test surface are shown in FIG. 7(a). The microscope was focused near the central region of the field of view. Hence, the perimeter of the field of view was noticeably out of focus.

The central in-focused regions in the two diffracted views were correlated using the DIC method. The resulted x-displacement field was substituted in Eq. (5) to obtain the topography of the test surface as shown in FIG. 7(b). Comparison between the measured and true height profiles along two section lines is given in FIG. 7(c). A good level of agreement is found, especially near the central region of the field of view.

Error Assessment

The root-mean-square (RMS) errors for all the measured data are tabulated in TABLE 1. The two sets of profile data show comparable errors at the sub-pixel level. The largest error occurs in the out-of-plane (z) direction and the least in the y-direction along which no diffraction occurs. The measured profile shows a large error of 1.345 μm (2.54 pixels), mainly due to image blurring in the perimeter of the measured area.

TABLE 1

Root-Mean-Square (RMS) Errors In 3D Displacement And Profile Measurement

| | Test | | |
|---|---|---|---|
| | 3D Displacement Measurement | | |
| Component | Rigid-body translation (μm) | Rigid-body rotation (μm) | 3D Profile Measurement (μm) |
| u | 0.038 | 0.084 | — |
| v | 0.022 | 0.031 | — |
| w (h) | 0.232 | 0.296 | 1.345 |

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A three-dimensional imaging system for a sample comprising:
    an imaging system;
    a first optical element positioned between the imaging system and a sample to provide an intermediate real image of at least a portion of a surface of the sample;
    a second optical element positioned between the imaging system and the intermediate real image provided by the first optical element to provide a plurality of virtual images of the intermediate real image;
    a narrow-band filter positioned between the imaging system and the second optical element to improve the quality of the plurality of virtual images by filtering out background light and suppressing chromatic dispersion of the second optical element;
    a third optical element positioned between the second optical element and the imaging system and configured to project the plurality of virtual images onto the imaging system; and
    a computer processor in communication with the imaging system for processing data related to the projected plurality of virtual images of the intermediate real image and for producing three-dimensional data of at least the portion of the surface of the sample.

2. The system of claim 1, wherein the system is configured to provide sub-micron spatial resolution for three-dimensional surface displacement and profile measurements of the sample.

3. The system of claim 1, wherein the first optical element comprises an objective.

4. The system of claim 1, wherein the second optical element comprises a dispersive element that provides the plurality of virtual images that contain three-dimensional surface displacement and profile measurements of the sample.

5. The system of claim 1, wherein the second optical element comprises a diffraction grating.

6. The system of claim 1, wherein the third optical element comprises one or more relay lenses.

7. The system of claim 1 further comprising an energy source to energize at least a surface of the sample.

8. The system of claim 7, wherein the energy source comprises an ultraviolet light source.

9. The system of claim 7 further comprising an energy source control to control the energization of at least a surface of the sample.

10. The system of claim 9, wherein the energy source control comprises a diaphragm to control the one or both of the size and location of the area of the surface energized.

11. A three-dimensional imaging system providing sub-micron spatial resolution for three-dimensional surface displacement and profile measurements of a sample comprising:
    an illumination path used to illuminate at least a portion of a surface of a sample;

an imaging path used to generate a full-field image of the portion of the surface of the sample;

an imaging system located in the imaging path;

an objective located in the imaging path, and positioned between the imaging system and the sample to produce an intermediate real image of the portion of the surface of the sample;

a diffraction grating located in the imaging path, and positioned between the imaging system and the intermediate real image produced by the objective to produce a plurality of virtual images of the intermediate real image, the plurality of virtual images containing three-dimensional surface displacement and profile measurements of the sample;

a narrow-band filter located in the imaging path, and positioned between the imaging system and the diffraction grating to improve the quality of the plurality of virtual images by filtering out background light and suppressing chromatic dispersion of the diffraction grating;

one or more relay lenses located in the imaging path, and for projecting the plurality of virtual images of the portion of the surface of the sample to the imaging system; and a computer processor in communication with the imaging system for processing data related to the projected plurality of virtual images of the intermediate real image, and for producing sub-micron spatial resolution three-dimensional data of the portion of the surface of the sample.

12. The system of claim 11 further comprising a beamsplitter to couple the illumination path into the imaging path.

13. The system of claim 11 further comprising an ultraviolet light source for the illumination path and an iris diaphragm in the illumination path to control one or both of the size and location of the area of the surface illuminated.

14. The system of claim 12 further comprising a condenser lens and reflecting mirror in the illumination path.

15. A method of three-dimensional imaging comprising:
directing an imaging system at a first optical element positioned between the imaging system and a sample;
forming an intermediate real image of at least a surface of the sample;
forming a plurality of virtual images of the intermediate real image;
performing narrow-band filtering on the plurality of virtual images to improve the quality of the plurality of virtual images by filtering out background light and suppressing chromatic dispersion;
projecting the plurality of virtual images onto the imaging system; and processing data related to the projected plurality of virtual images of the intermediate real image to produce sub-micron spatial resolution three-dimensional data of at least a surface of the sample.

16. The method of claim 15, wherein forming a plurality of virtual images of the intermediate real image comprises forming a plurality of virtual images of the intermediate real image via a second optical element positioned between the imaging system and the first optical element.

17. The method of claim 15 further comprising projecting a real image of at least a surface of the sample to the imaging system;
wherein processing data comprises processing data related to the real image and the plurality of virtual images of the intermediate real image to produce sub-micron spatial resolution three-dimensional data of at least a surface of the sample.

18. The system of claim 1, wherein
the producing the three-dimensional data comprises:
calculating a full-field displacement of the portion of the surface of the sample based on a two first order virtual images of the plurality of virtual images; and
determining a three-dimension surface profile of the portion of the surface of the sample based on the calculated displacement, and
the determining a three-dimension surface profile comprises calculating a depth at a point $(x_p, y_p)$ on the portion of the surface based on the function:

$h(x_p, y_p) = \beta(x_{p_+}" - x_{p_-}")$, where $\beta$ is a free parameter that can be calibrated against a known 3D displacement field, and $x_+"$ and $x_-"$ is the relative displacement between two first order virtual images of the plurality of virtual images.

19. The system of claim 18, wherein
the second optical element comprises a diffraction grating having a first-order diffraction angle $\theta$ and an objective lens having a magnification factor N, and
$\beta$ may be calculated based on the function:

$$\beta = -\frac{1}{N*M*\tan\theta},$$

where M is the out-of-plane magnification factor.

20. The system of claim 1, wherein
the first optical element comprises first and second infinity-corrected objectives, and the narrow-band pass filter is placed between the third optical element and the imaging system.

* * * * *